Sept. 5, 1950 D. A. STARK 2,521,264
HYDRAULIC RELIEF VALVE
Filed Dec. 31, 1943 2 Sheets-Sheet 1
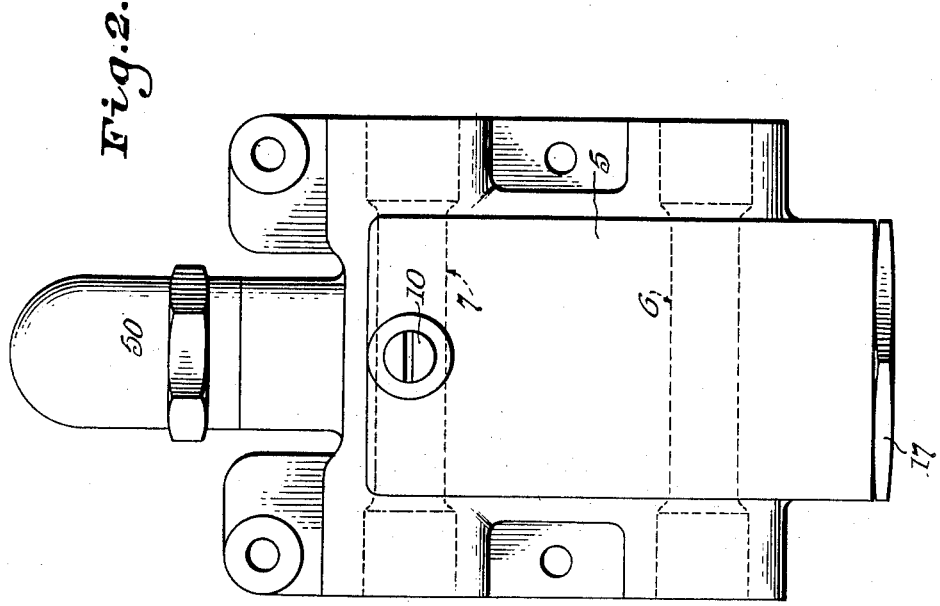
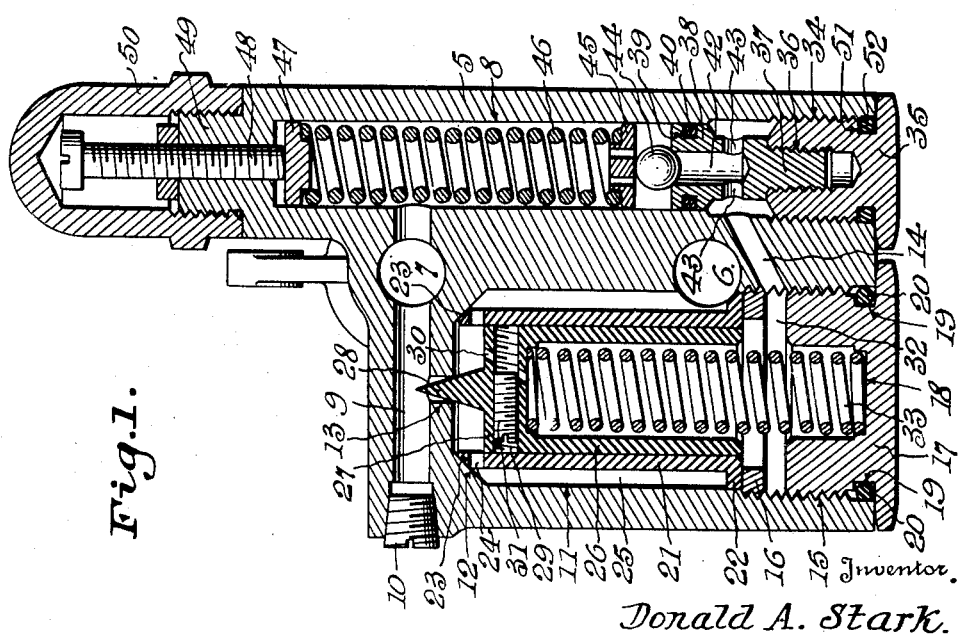
Inventor.
Donald A. Stark.
By Mason, Porter & Diller
Attorneys Sept. 5, 1950        D. A. STARK        2,521,264
HYDRAULIC RELIEF VALVE
Filed Dec. 31, 1943        2 Sheets-Sheet 2
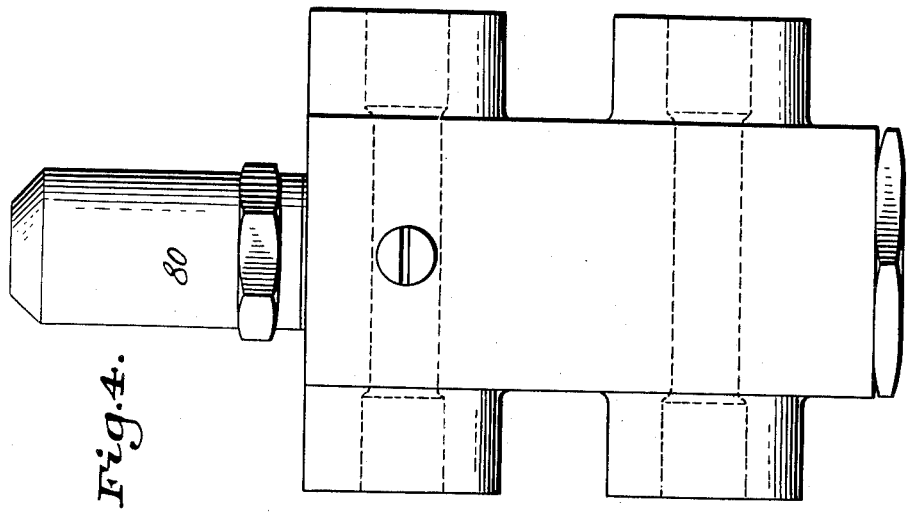
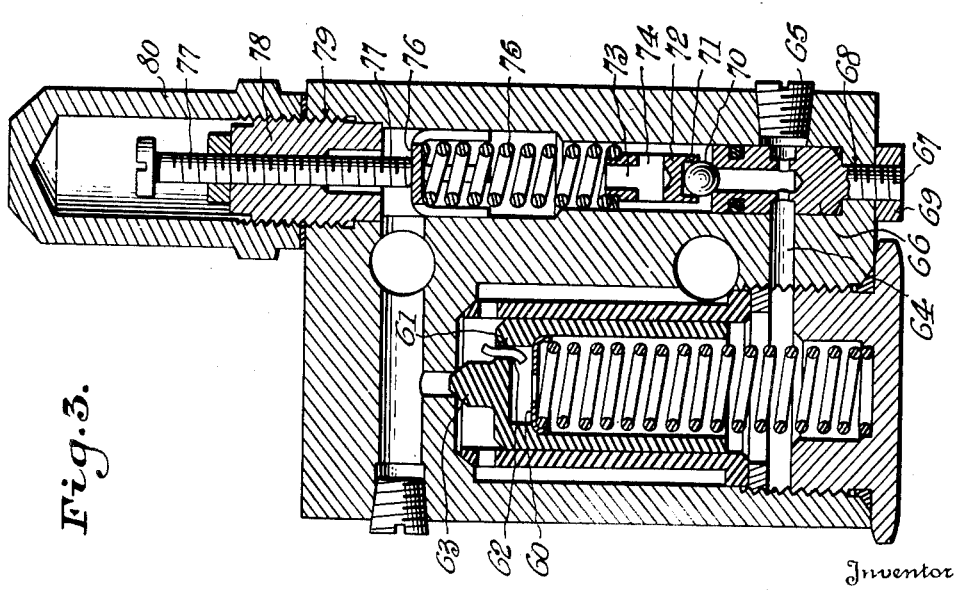
Inventor
Donald A. Stark.
By Mason, Porter & Diller
Attorneys Patented Sept. 5, 1950

2,521,264

UNITED STATES PATENT OFFICE 2,521,264

HYDRAULIC RELIEF VALVE

Donald A. Stark, Willoughby Township, Lake County, Ohio, assignor to The Parker Appliance Company, Cleveland, Ohio, a corporation of Ohio Application December 31, 1943, Serial No. 516,485

4 Claims. (Cl. 137—53)

The invention relates generally to valve structures and primarily seeks to provide a novel, simple and efficiently operable hydraulic relief valve structure in which is included a main valve normally effective to close off communication between a pressure port and an exhaust or pressure relief port, and a pilot valve for controlling operation of said main valve to open said communication and provide for relief of pressure whenever pressure at the pressure port exceeds a predetermined maximum.

Valve structures of the general type referred to have been provided heretofore, but the herein disclosed relief valve structure is thought to present marked advantages in the way of simplicity in structure, efficiency in function, adjustability to varied use demands, and in assurance against sticking or faulty operation due to lack of uniformity of expansion and contraction of engaging movable parts.

In its more detailed nature the invention resides in providing a novel hydraulic relief valve structure including a body having an exhaust port adapted for connection with a return or drain line, a pressure inlet port adapted for connection with a pressure line, a pressure chamber communicating with the inlet port, a pressure balancing chamber, a main valve having a port therethrough affording bleed communication between said chambers, spring means effective upon equalization of pressures in said chambers through the bleed port to seat the valve and prevent communication between the inlet port and the exhaust port, a relief control duct communicating between the balancing chamber and the exhaust port, and a pilot valve normally closing said duct and adapted to be unseated whenever pressure in said chambers builds up to a predetermined maximum thereby to release pressure fluid from the balancing chamber with greater rapidity than it can be replaced through the bleed port and thus bring about unbalancing of pressures at opposite sides of the main valve effective to unseat the main valve and bring about relief of pressure from the pressure line to the return or drain line.

An object of the invention is to provide a structure of the character stated in which novel means is provided for adjusting the pressure fluid transfer capacity of the bleed port in the main valve.

Another object of the invention is to provide a structure of the character stated in which the main valve is in the form of a hollow sleeve closed at one end except for the bleed port, said valve being reciprocable in a sleeve which is spaced from the valve body and separates the pressure chamber from the balancing chamber, and in which the main valve and said sleeve are formed of the same metal so that the valve and its guide will have the same coefficient of expansion.

Another object of the invention is to provide in a valve structure of the character stated a novel arrangement of pilot valve and means for adjusting the resistance to opening of said valve.

With the above and other objects in view that will hereinafter appear, the nature of the invention will be more fully understood by following the detailed description, the appended claims and the several views illustrated in the accompanying drawings.

In the drawings:

Figure 1 is a vertical cross sectional view illustrating one form of embodiment of the invention.

Figure 2 is a side elevation of the valve structure illustrated in Figure 1.

Figure 3 is a vertical cross sectional view illustrating a modified form of embodiment of the invention.

Figure 4 is a side elevation of the valve structure illustrated in Figure 3.

In the form of the invention illustrated in Figures 1 and 2 the valve structure includes a body or casing 5 having a port or passage 6 extending transversely therethrough and adapted for connection in a pressure line, and a port or passage 7 passing transversely therethrough in parallel spaced relation to the port 6 and adapted for connection with a return or drain line.

A pilot valve bore or duct 8 is formed in the body or casing 5 adjacent and in right angular relation to the ports 6 and 7, in the manner clearly illustrated in Figure 1, and a relief duct 9 extends through one side of said body at right angles to and communicating with the bore or duct 8 and intersecting the port 7. At the side of the body the duct 9 is closed by a removable plug 10.

A main valve bore 11 is formed in the body or casing 5 in parallel spaced relation to the bore or duct 8 and in position for extending into and communicating with the pressure port 6 at one side. The bore 11 terminates short of the relief duct 9 and the end wall thereof adjacent said duct is shaped to present a coniform seat 12. See Figure 1. A relief port 13 communicates between the otherwise closed end of the bore 11 and the before mentioned relief duct 9, and a relief control duct 14 communicates between the bore 11 and the pilot valve bore or duct 8.

The bore 11 is internally threaded at its open end as at 15 to threadably receive an abutment ring 16 and a closure plug 17, the latter being provided with a spring end receiving socket 18. The plug 17 is equipped with an annular groove 19 wherein is mounted a packing ring 20.

A valve guide sleeve 21 is mounted in the main valve bore 11 and is equipped with an outwardly directed spacer flange 22 which engages the side walls of the bore in the manner illustrated in Figure 1 for holding the sleeve in spaced relation to said bore walls. The guide sleeve flange is engaged by the abutment ring 16, and at its opposite end the sleeve 21 is chamfered as at 23 so as to snugly fit the coniform bore seat 12 against which it is securely pressed by adjustment of said ring 16. The chamfered end of the sleeve is provided with side wall ports which afford communication between the annular space or chamber 25 surrounding the sleeve 21 and the space within the chamfered end of such sleeve.

The main valve member is reciprocably mounted in the guide sleeve 21 and takes the form of a sleeve 26 which is open at its lower end and closed at its upper end 27 from which projects a coniform valve extension 28 adapted to engage in and normally close the relief port 13. The end 27 of the main valve is provided with an internally threaded cross bore 29, and said valve end is pierced by an angularly disposed bleed port 30 which intersects said cross bore. A screw 31 is adjustably mounted in the cross bore 29, and by adjustment of this screw it is possible to adjust the pressure fluid transfer capacity of the bleed port 30, which is effective to permit bleeding of pressure fluid from the chamber within sleeve 21 above the end 27 of the main valve member into the chamber within said main valve member. The last mentioned chamber within the main valve member and the space below said valve member and its guiding sleeve 21 constitute a pressure balancing chamber designated 32. The space within the guide sleeve 21 above the closed end 27 of the main valve and the annular space 25 surrounding said sleeve constitute a pressure chamber which communicates with the pressure line connecting port 6 in the manner clearly illustrated in Figure 1. A spring 33 is mounted in the plug socket 18 and extends into engagement with the closed end 27 of the main valve 26 and is effective when pressure is equalized in the above mentioned pressure and pressure balancing chambers to hold the said main valve against its seat, that is in position for closing the relief port 13 and preventing passage of pressure fluid therethrough into the relief duct 9.

The pilot valve bore 8 is internally threaded as at 34 at its open end for threadably receiving a closure plug 35. The plug 35 is equipped with an internally threaded central bore 36 into which is threaded the stem 37 of a pilot valve seat plug 38 which snugly fits the bore 8 above the relief control duct 14. The plug is equipped with an annular groove 39 wherein is mounted a packing ring 40 which effectively seals the bore 8 against direct leakage of pressure fluid past said plug. The plug 38 is reduced in diameter at its lower portion opposite the duct 14 and is equipped with a center duct 42 and cross ports 43 communicating with the duct 14. A ball valve 44 seats on the upper end of the plug 38 and is held on its seat by an apertured disc 45 opposed by one end of a compression spring 46, the other end of said spring being engaged with another abutment disc 47 which is in turn engaged by an adjuster screw 48. The screw 48 is threadably mounted in the valve body extension 49, and by adjustment of this screw the resistance to compression of the spring 46 can be varied so as to vary the maximum pressure to be set up in the valve structure before the pilot valve will open and provide for the desired relief of pressure in the valve structure in the manner later to be described. A closure cap 50 preferably is threadably mounted on the body extension 49 so as to protect the adjuster screw 48 against damage or tampering.

Like the plug 17, the plug 35 preferably is provided with an annular groove 51 equipped with a packing ring 52 for effectively sealing the end of the bore 8 against leaking.

As before stated, the pressure in the pressure chamber 25 and in the upper end of the sleeve 21 surrounding the valve extension 28 and the pressure in the balancing chamber 32 normally is balanced by reason of the bleed communication through the port 30, and so long as the pressure in the pressure line and the port 6 is less than the predetermined maximum set by adjustment of the spring 46, the pilot ball valve 44 will remain seated and the main valve 26, 28 will remain seated by action of the relatively light spring 33. Whenever the fluid pressure exceeds said predetermined maximum, the pilot ball valve 44 will be unseated by pressure acting through the relief control duct portion 14, permitting pressure fluid to pass upwardly through the bore 8 to the exhaust port 7. The resulting drop in pressure in the balancing chamber 32 will cause the dominant pressure above the closed end of the main valve 26 to force said valve downward because the pressure fluid will be unable to bleed through the port 30 rapidly enough to reestablish equalization of pressure before said valve opening is effected. Thus pressure fluid will be permitted to escape through the relief port 13 in the manner desired. When the pressure in the pressure and balancing chambers is again equalized by bleeding of fluid through the port 30 the parts will again be restored to the normal condition illustrated in Figure 1.

In the slightly modified form of the invention illustrated in Figures 3 and 4 the valve structure is constructed in generally the same manner with the exceptions hereinafter outlined. The main valve seating spring acts against an apertured disc 60 instead of directly against the closed end of the main valve. The closed end of the main valve is equipped with a bleed port 61 in which is mounted a piece of wire 62 bent into shape for being self-retaining and which is effective to control the pressure fluid transfer capacity of said port. By selecting wire of different sizes the capacity of the bleed port can be varied at will. It will also be noted that in this form of the invention the main valve extension takes the form of a frustocone.

It will also be observed by reference to Figure 3 that the duct 64 communicating between the pressure balancing chamber and the pilot valve bore is bored at right angles to and intersects the pilot valve bore, and that a threadably mounted access plug 65 closes the outer end of said duct. The pilot valve seat plug 66 has its externally threaded shank 67 extended through an aperture 68 in the valve body at the lower end of the pilot valve bore, and the extended shank and the connected plug are secured in place by a nut 69.

The pilot ball valve 70 seats on the center duct in the plug 66 and is confined in an end recess 71 provided in a presser stem 72 which is also equipped with center and cross ducts designated 73 and 74 respectively. A compression spring 75 engages the upper end of the stem 72, and said spring engages at its upper end with a spider 76 slidably mounted in the pilot valve bore at about the level of the relief duct. As in the first described form of the invention, the pilot valve seating spring is adjustable by a screw 77 which engages the spider 76 and is threaded through a plug 78 which is in turn threadably mounted as at 79 on the valve body. A closure cap 80 is threadably mounted on an extended portion of the plug 78 and serves to protect the screw 77 against damage or tampering.

The arrangement of parts in the last described form of the invention being substantially the same as in the first described form, it is thought to be unnecessary to again describe in detail the manner in which these parts cooperate and function.

It is to be understood that the details of construction of the cooperating parts can be variously changed without departing from the spirit and scope of the invention, as defined in the appended claims.

What is claimed is:

1. In a hydraulic relief valve structure, a body having an exhaust port adapted for connection with a return or drain line, a pressure inlet port adapted for connection with a pressure line, a pressure chamber communicating with the inlet port, and a pressure balancing chamber, a main valve having a port therethrough affording bleed communication between said chambers, spring means effective upon equalization of pressures in said chambers through the bleed port to seat the valve and prevent communication between the inlet and exhaust ports, a relief control duct of greater capacity than said bleed port and communicating between the balancing chamber and the exhaust port, a pilot valve normally closing said duct and adapted to be unseated whenever pressure in said chambers builds up to a predetermined maximum thereby to release pressure fluid from the balancing chamber with greater rapidity than it can be replaced through the bleed port and thus bring about unbalancing of pressures at opposite sides of the main valve effective to unseat the main valve and bring about relief of pressure from the pressure line to the return or drain line, said pressure chamber communicating with the exhaust port through a main valve controlled port, said main valve comprising a hollow sleeve closed at one end except for the bleed port and having a coniform extension normally extending into and closing said main valve controlled port, said pressure chamber terminating in a coniform seat surrounding said main valve controlled port, said main valve being reciprocable in a sleeve having an outwardly directed flange engaging the walls of the pressure chamber and spacing the main valve guide sleeve therein, and means engaging said flange for securing the guide sleeve in the pressure chamber with its end pressed against said coniform seat, said guide sleeve having porting therein communicating between the interior of the guide sleeve above the closed end of the main valve and the space surrounding said guide sleeve which in turn communicates with the pressure inlet port.

2. In a hydraulic relief valve structure, a body having an exhaust port adapted for connection with a return or drain line, a pressure inlet port adapted for connection with a pressure line, a pressure chamber communicating with the inlet port, and a pressure balancing chamber, a main valve having a port therethrough affording bleed communication between said chambers, means for varying the bleeding capacity of said bleed port, spring means effective upon equalization of pressures in said chambers through the bleed port to seat the valve and prevent communication between the inlet and exhaust ports, a relief control duct of greater capacity than said bleed port and communicating between the balancing chamber and the exhaust port, a pilot valve normally closing said duct and adapted to be unseated whenever pressure in said chambers builds up to a predetermined maximum thereby to release pressure fluid from the balancing chamber with greater rapidity than it can be replaced through the bleed port and thus bring about unbalancing of pressures at opposite sides of the main valve effective to unseat the main valve and bring about relief of pressure from the pressure line to the return or drain line, said pressure chamber communicating with the exhaust port through a main valve controlled port, said main valve comprising a hollow sleeve closed at one end except for the bleed port and having a coniform extension normally extending into and closing said main valve controlled port, said pressure chamber terminating in a coniform seat surrounding said main valve controlled port, said main valve being reciprocable in a sleeve having an outwardly directed flange engaging the walls of the pressure chamber and spacing the main valve guide sleeve therein, and means engaging said flange for securing the guide sleeve in the pressure chamber with its end pressed against said coniform seat, said guide sleeve having porting therein communicating between the interior of the guide sleeve above the closed end of the main valve and the space surrounding said guide sleeve which in turn communicates with the pressure inlet port.

3. In a hydraulic relief valve structure, a body having an exhaust port adapted for connection with a return or drain line, a pressure inlet port adapted for connection with a pressure line, a pressure chamber communicating with the inlet port, and a pressure balancing chamber, a main valve having a port therethrough affording bleed communication between said chambers, threadably mounted means for varying the bleeding capacity of said bleed port, spring means effective upon equalization of pressures in said chambers through the bleed port to seat the valve and prevent communication between the inlet and exhaust ports, a relief control duct of greater capacity than said bleed port and communicating between the balancing chamber and the exhaust port, a pilot valve normally closing said duct and adapted to be unseated whenever pressure in said chambers builds up to a predetermined maximum thereby to release pressure fluid from the balancing chamber with greater rapidity than it can be replaced through the bleed port and thus bring about unbalancing of pressures at opposite sides of the main valve effective to unseat the main valve and bring about relief of pressure from the pressure line to the return or drain line, said pressure chamber communicating with the exhaust port through a main valve controlled port, said main valve comprising a hollow sleeve closed at one end except for the bleed port and having a coniform extension normally extending into and closing said main valve controlled port, said pressure chamber terminating in a coniform seat surrounding said main valve controlled port, said main valve being reciprocable in a sleeve having an outwardly directed flange engaging the walls of the pressure chamber and spacing the main valve guide sleeve therein, and means engaging said flange for securing the guide sleeve in the pressure chamber with its end pressed against said coniform seat, said guide sleeve having porting therein communicating between the interior of the guide sleeve above the closed end of the main valve and the space surrounding said guide sleeve which in turn communicates with the pressure inlet port.

4. In a hydraulic relief valve structure, a body having an exhaust port adapted for connection with a return or drain line, a pressure inlet port adapted for connection with a pressure line, a pressure chamber communicating with the inlet port, and a pressure balancing chamber, a main valve having a port therethrough affording bleed communication between said chambers, means comprising a bent wire self retained in and restricting passage through said bleed port, spring means effective upon equalization of pressures in said chambers through the bleed port to seat the valve and prevent communication between the inlet and exhaust ports, a relief control duct of greater capacity than said bleed port and communicating between the balancing chamber and the exhaust port, a pilot valve normally closing said duct and adapted to be unseated whenever pressure in said chambers builds up to a predetermined maximum thereby to release pressure fluid from the balancing chamber with greater rapidity than it can be replaced through the bleed port and thus bring about unbalancing of pressures at opposite sides of the main valve effective to unseat the main valve and bring about relief of pressure from the pressure line to the return or drain line, said pressure chamber communicating with the exhaust port through a main valve controlled port, said main valve comprising a hollow sleeve closed at one end except for the bleed port and having a coniform extension normally extending into and closing said main valve controlled port, said pressure chamber terminating in a coniform seat surrounding said main valve controlled port, said main valve being reciprocable in a sleeve having an outwardly directed flange engaging the walls of the pressure chamber and spacing the main valve guide sleeve therein, and means engaging said flange for securing the guide sleeve in the pressure chamber with its end pressed against said coniform seat, said guide sleeve having porting therein communicating between the interior of the guide sleeve above the closed end of the main valve and the space surrounding said guide sleeve which in turn communicates with the pressure inlet port.

DONALD A. STARK.

REFERENCES CITED

The following references are of record in the file of this patent:

UNITED STATES PATENTS

| Number | Name | Date |
|---|---|---|
| 543,773 | Massey | July 30, 1895 |
| 781,913 | Schutte | Feb. 7, 1905 |
| 1,390,851 | Winckle | Sept. 13, 1921 |
| 1,451,136 | Allnutt | Apr. 10, 1923 |
| 1,612,567 | Browne | Dec. 28, 1926 |
| 1,660,382 | Hopkins | Feb. 28, 1928 |
| 1,944,249 | Lencke | Jan. 23, 1934 |
| 2,035,954 | Focht | Mar. 31, 1936 |
| 2,043,203 | Sorensen | June 2, 1936 |
| 2,043,453 | Vickers | June 9, 1936 |
| 2,150,266 | Cotner | Mar. 14, 1939 |
| 2,212,607 | Langdon | Aug. 27, 1940 |
| 2,295,931 | Caminez | Sept. 15, 1942 |
| 2,308,347 | Asselin | Jan. 12, 1943 |
| 2,333,522 | Clifton | Nov. 2, 1943 |

FOREIGN PATENTS

| Number | Country | Date |
|---|---|---|
| 461,362 | Great Britain | Feb. 16, 1937 |